United States Patent
Tsai et al.

(10) Patent No.: US 8,115,746 B2
(45) Date of Patent: Feb. 14, 2012

(54) DISPLAY PANEL WITH MULTI-TOUCH FUNCTION

(75) Inventors: Yu-Cheng Tsai, Hsin-Chu (TW);
Chao-Chen Wang, Hsin-Chu (TW);
Pang-Chiang Chia, Hsin-Chu (TW);
Kuo-Hsing Cheng, Hsin-Chu (TW);
Mei-Sheng Ma, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 499 days.

(21) Appl. No.: 12/424,551

(22) Filed: Apr. 16, 2009

(65) Prior Publication Data
US 2010/0134427 A1 Jun. 3, 2010

(30) Foreign Application Priority Data
Nov. 28, 2008 (TW) ................................ 97146302 A

(51) Int. Cl.
*G06F 3/041* (2006.01)
(52) U.S. Cl. ...... 345/173; 345/104; 345/174; 178/18.03
(58) Field of Classification Search .................. 345/104, 345/173, 178; 349/48; 178/18.01–20.04
See application file for complete search history.

(56) References Cited

U.S. PATENT DOCUMENTS

| 7,508,726 B2 * | 3/2009 | Shiah et al. ................ 365/205 |
| 7,683,887 B2 * | 3/2010 | Yasukawa .................... 345/173 |
| 2006/0227095 A1 * | 10/2006 | Kim et al. .................... 345/100 |
| 2007/0205999 A1 * | 9/2007 | Akimoto et al. ............. 345/207 |
| 2008/0129898 A1 * | 6/2008 | Moon ............................ 349/12 |
| 2008/0278451 A1 * | 11/2008 | Lee ............................. 345/173 |
| 2009/0015562 A1 * | 1/2009 | Yasukawa .................... 345/173 |
| 2009/0201259 A1 * | 8/2009 | Nurmi .......................... 345/173 |
| 2009/0303193 A1 * | 12/2009 | Lim et al. .................... 345/173 |

OTHER PUBLICATIONS

U.S. Appl. No. 12/383,093, Mar. 19, 2009, Integrated Touch Panel and Method for Making Same, Chang.

* cited by examiner

*Primary Examiner* — Amare Mengistu
*Assistant Examiner* — Dmitriy Bolotin
(74) *Attorney, Agent, or Firm* — Winston Hsu; Scott Margo

(57) ABSTRACT

A display panel with multi-touch function includes a display area and a non-display area. The display area includes a data line, a gate line, a first sensing line, a second sensing line, and a sensing unit. The sensing unit electrically connects the first and second sensing lines according to a touch signal or electrically isolates the first sensing line from the second sensing line. The non-display area includes a gate driver, a first switch and a second switch. The first switch provides a path for charging the second sensing line according to a scan signal, and the second switch provides a path for discharging the second sensing line according to a reset signal.

24 Claims, 3 Drawing Sheets

DISPLAY PANEL WITH MULTI-TOUCH FUNCTION

BACKGROUND OF THE INVENTION

1. Field of the Invention

The present relates to a display panel, and more particularly, to an LCD display panel with multi-touch function.

2. Description of the Prior Art

Due to small size and light weight, liquid crystal display (LCD) devices gradually replace traditional cathode ray tube (CRT) displays, and have been widely used in various electronic devices. With rapid shrinkage in size, there is less room for traditional input devices such as keyboards or mice. Therefore, touch panels providing tactile inputs and display function have become more and more popular.

There are various types of touch panels, such as resistive, capacitive, surface acoustic or infrared. Based on operating principles and costs, different types of LCD devices are particularly suitable for certain applications. For example, resistive type touch panels detect voltage variations caused by tactile inputs. Due to low manufacturing costs, resistive type touch panels are the most widespread technique and commonly used in consumer products such as PDAs, cellular phones, personal GPS devices, electronic dictionaries or household electronic products. Capacitive type touch panels detect capacitance variations corresponding to changes in static electricity caused by tactile inputs. With better light penetration but entailing higher manufacturing costs, capacitive type touch panels are mainly used in medium/large-size products, such as ATMs, KIOSKs or industrial equipment. By detecting acoustic waves, surface acoustic type touch panels produce clear and strong tactile signals, but are highly susceptible to the effects of external noises. Surface acoustic type touch panels are mainly used in large-size products, such as KIOSKs, automatic ticketing machines and medical equipment. Infrared type touch panels detect light interference caused by tactile inputs and can achieve 100% light penetration. However due to bulk size and low accuracy, infrared type touch panels are mainly used in high-end products, such as ATMs, office automation machinery, electronic whiteboards or industrial equipment.

Referring to FIG. 1, which is a diagram illustrating a prior art LCD device 100. The LCD device 100 includes a display area 120 and a non-display area. A plurality of parallel data lines $D_1$-$D_m$, a plurality of parallel gate lines $G_1$-$G_n$, a plurality of display units $P_{11}$-$P_{mn}$, a plurality of parallel sensing lines $S_{X1}$-$S_{Xm}$, a plurality of sensing units $S_{11}$-$S_{mn}$, and a plurality of thin film transistor (TFT) switches $TFT_{11}$-$TFT_{mn}$ are disposed in the display area 120. Each of the sensing lines $S_{X1}$-$S_{Xm}$ is disposed between two corresponding adjacent data lines among the plurality of data lines $D_1$-$D_m$. The data lines $D_1$-$D_m$ and the gate lines $G_1$-$G_N$ intersect each other and form a matrix in which the display units $P_{11}$-$P_{mn}$ are disposed at corresponding intersections. Each display unit, comprising a TFT switch, a liquid crystal capacitor $C_{LC}$ and a storage capacitor $C_{ST}$, can control light penetration based on the charges stored in the capacitors. The sensing units $S_{11}$-$S_{mn}$, capable of detecting tactile inputs, are turned on (short-circuited) when receiving a touch signal. The gates of the TFT switches $TFT_{11}$-$TFT_{mn}$ are coupled to corresponding gate lines. According to the scan signals sent by the gate lines, the sensing units $S_{11}$-$S_{mn}$ can be electrically connected to or isolated from corresponding sensing lines $S_{X1}$-$S_{Xm}$, respectively.

A source driver 130, a gate driver 140 and a detecting circuit 150 are disposed on the non-display area of the LCD device 100. The gate driver 140 is coupled to the gate lines $G_1$-$G_n$ for generating scan signals in order to turn on/off the TFT switches in corresponding display units $P_{11}$-$P_{mn}$ via corresponding gate lines. The source driver 130 is coupled to the data lines $D_1$-$D_m$ for generating data signals to corresponding display units for displaying images. The detecting circuit 150 is coupled to the sensing lines $S_{X1}$-$S_{Xm}$ for calculating touch locations according to signals received from the sensing lines $S_{X1}$-$S_{Xm}$.

SUMMARY OF THE INVENTION

The present invention provides a display panel with multi-touch function comprising a display area and a non-display area. The display area comprises a data line for transmitting a data signal corresponding to a display image; a gate line for transmitting a scan signal; a display unit coupled to the data line and the gate line for displaying images according to the scan signal and the data signal; a first sensing line for outputting a sensing signal corresponding to the scan signal; a second sensing line for transmitting the sensing signal; and a sensing unit coupled between the first and second sensing lines for electrically connecting the first sensing line with the second sensing line according to a touch signal or electrically isolating the first sensing line from the second sensing line. The non-display area comprises a gate driver for outputting the scan signal and a reset signal; a first switch coupled between the gate line and the second sensing line for providing a path to charge the second sensing line according to the scan signal; and a second switch coupled to the second sensing line.

The present invention also provides display panel with multi-touch function comprising a display area and a non-display area. The display area comprises a plurality of data lines for transmitting data signals corresponding to display images; a plurality of gate lines for transmitting scan signals; a plurality of display units each coupled to a corresponding data line among the plurality of data lines and to a corresponding gate line among the plurality of gate lines, each display unit displaying images according the scan signal received from the corresponding gate line and the data signal received from the corresponding data line; a plurality of first sensing lines; a plurality of second sensing lines; a plurality of sensing units each coupled between a corresponding first line and a corresponding second sensing line, each sensing unit electrically connecting the corresponding first sensing line with the corresponding second sensing line according to a corresponding touch signal or electrically isolating the first corresponding sensing line from the second corresponding sensing line. The non-display area comprises a gate driver for outputting scan signals and reset signals; a plurality of switch circuits for providing paths to charge the corresponding second sensing lines according to the corresponding scan signals and providing paths to discharge the corresponding second sensing lines according to the reset signals, respectively.

These and other objectives of the present invention will no doubt become obvious to those of ordinary skill in the art after reading the following detailed description of the preferred embodiment that is illustrated in the various figures and drawings.

DETAILED DESCRIPTION

Traditional touch panels employ single-touch response in which only one tactile input can be transmitted to the controller at a time. In certain complicated applications (such as 3D image processing interfaces), the user is required to use the mouse and the keyboard in order to achieve the best effect. The newly-developed multi-touch technique, capable of recording and identifying multiple tactile inputs at the same time, allow the user to control a touch screen using gestures, movements or contacts, as well as allow multiple users to perform Internet communication (such as interactive TV walls).

Figure 1:
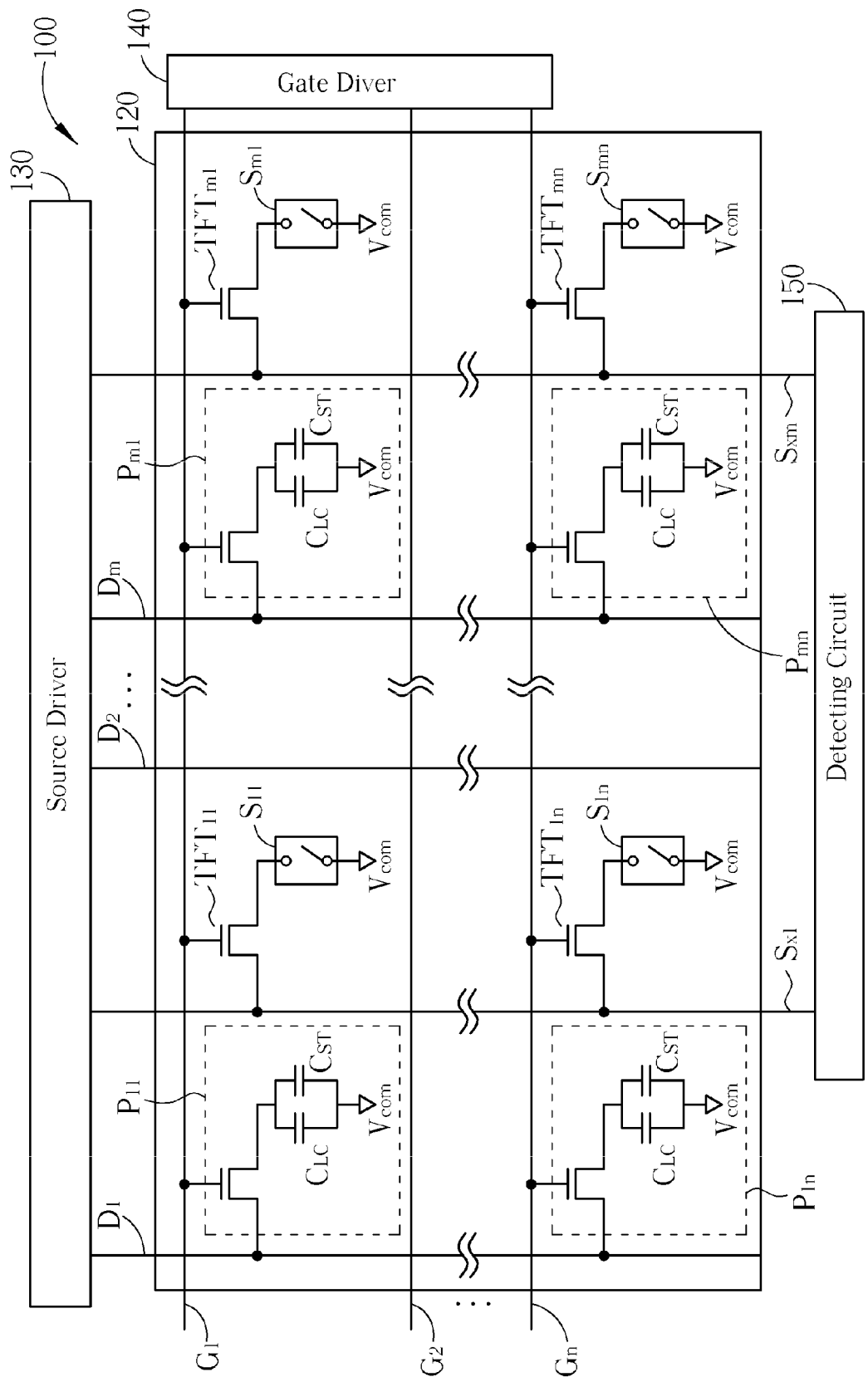
FIG. 1 is a diagram illustrating a prior art LCD device.
Figure 2:
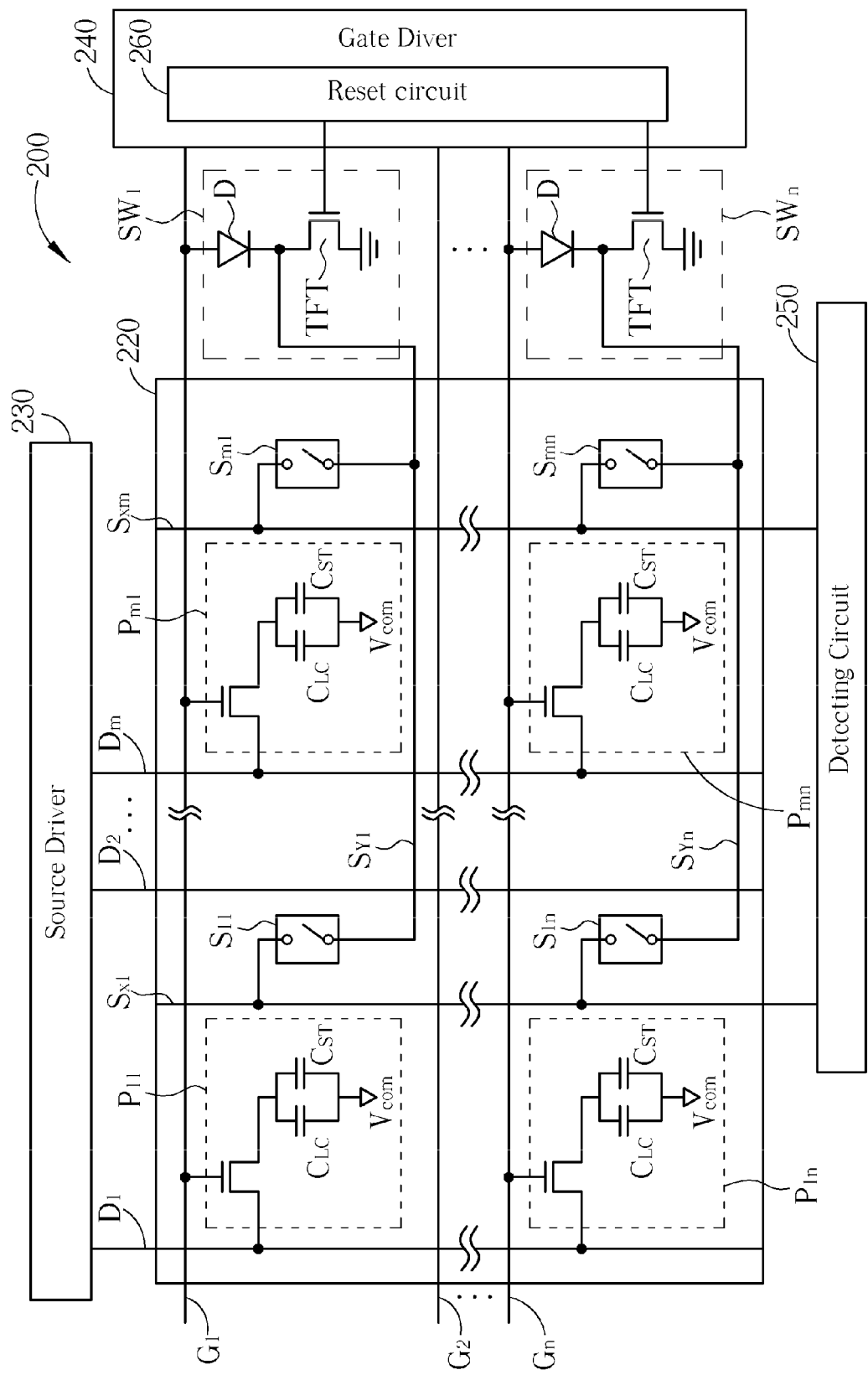
FIG. 2 is a diagram illustrating an LCD device with multi-touch function according to a first embodiment of the present invention.

Referring to FIG. 2, which is a diagram illustrating an LCD device 200 with multi-touch function according to a first embodiment of the present invention. The LCD device 200 includes a display area 220, in which a plurality of parallel data lines $D_1$-$D_m$, a plurality of parallel gate lines $G_1$-$G_n$, a plurality of display units $P_{11}$-$P_{mn}$, a plurality of parallel sensing lines $S_{X1}$-$S_{Xm}$ and $S_{Y1}$-$S_{Yn}$, and a plurality of sensing units $S_{11}$-$S_{mn}$ are disposed. Each of the sensing lines $S_{X1}$-$S_{Xm}$ is disposed parallel to and between two corresponding adjacent data lines among the plurality of data lines $D_1$-$D_m$. Each of the sensing lines $S_{Y1}$-$S_{Yn}$ is disposed parallel to and between two corresponding adjacent gate lines among the plurality of gate lines $G_1$-$G_n$. The data lines $D_1$-$D_m$ and the gate lines $G_1$-$G_n$ intersect each other and form a matrix in which the display units $P_{11}$-$P_{mn}$ are disposed at corresponding intersections. Each display unit, comprising a TFT switch, a liquid crystal capacitor $C_{LC}$ and a storage capacitor $C_{ST}$, can control light penetration based on the charges stored in the capacitors. The TFT switch of each display unit includes a first end coupled to a corresponding data line, a second end and a control end coupled to a corresponding gate line. The shunt liquid crystal capacitor $C_{LC}$ and the storage capacitor $C_{ST}$ in each display unit are coupled between the second end of the TFT switch and a common node $V_{com}$. The sensing units $S_{11}$-$S_{mn}$, capable of detecting tactile inputs, are turned on (short-circuited) when receiving a touch signal.

The sensing units $S_{11}$-$S_{mn}$ are coupled to corresponding sensing lines $S_{X1}$-$S_{Xm}$ at one end, and to corresponding switching circuits $SW_1$-$SW_n$ disposed on a non-display area of the LCD device 200 via corresponding sensing lines $S_{Y1}$-$S_{Yn}$ at the other end. Based on the types of the LCD device, the sensing units $S_{11}$-$S_{mn}$ can detect various touch signals, such as those reflecting variations in voltage, capacitance, light intensity or ultra-sonic signals. The sensing units $S_{11}$-$S_{mn}$ are turned on (short-circuited) when receiving a touch signal. In other words, the sensing units $S_{11}$-$S_{mn}$ electrically connect the corresponding sensing lines $S_{X1}$-$S_{Xm}$ with the corresponding sensing lines $S_{Y1}$-$S_{Yn}$ when receiving the touch signal, and the switching circuits $SW_1$-$SW_n$ are coupled to corresponding sensing lines $S_{X1}$-$S_{Xm}$ via corresponding sensing lines $S_{Y1}$-$S_{Yn}$, respectively.

A source driver 230, a gate driver 240, a detecting circuit 250 and a reset circuit 260 are disposed on the non-display area of the LCD device 200. The gate driver 240 is coupled to the gate lines $G_1$-$G_n$ for generating scan signals in order to turn on/off the TFT switches in corresponding display units $P_{11}$-$P_{mn}$ via corresponding gate lines. The source driver 230 is coupled to the data lines $D_1$-$D_m$ for generating data signals to corresponding display units for displaying images. The detecting circuit 250 is coupled to the sensing lines $S_{X1}$-$S_{Xm}$ for calculating touch locations according to sensing signals received from the sensing lines $S_{X1}$-$S_{Xm}$. The sensing signals include the scan signals sent to the display units whose corresponding sensing units receive touch signals.

The switching circuits $SW_1$-$SW_n$ of the present invention each include two switching devices. In the first embodiment of the preset invention, each switching circuit includes a diode D and a TFT switch. In multi-touch applications, when a user touches the sensing units $S_{11}$ and $S_{1n}$ simultaneously, both the sensing lines $S_{Y1}$ and $S_{Yn}$ are coupled to the sensing line $S_{X1}$. Without further control, the sensing line $S_{X1}$ is unable to identify touch signals under this circumstance. Thus, in the LCD device 200 of the present invention, the diodes D in the switching circuits are used for controlling multi-touch applications. When the gate line $G_1$ receives a scan signal, both the sensing units $S_{11}$ and $S_{1n}$ are short-circuited, but only the diode D in the switching circuit $SW_1$ is turned on, thereby transmitting a sensing signal corresponding to the received scan signal to the sensing line $S_{X1}$ via the sensing unit $S_{11}$. Similarly, when the gate line $G_n$ receives a scan signal, both the sensing units $S_{11}$ and $S_{1n}$ are short-circuited, but only the diode D in the switching circuit $SW_n$ is turned on, thereby transmitting a sensing signal corresponding to the received scan signal to the sensing line $S_{X1}$ via the sensing unit $S_{1n}$.

Meanwhile, if the sensing lines $S_{Y1}$-$S_{Yn}$ always remain at high voltage level, the LCD device can not perform multi-touch function. When receiving a scan signal from the gate line $G_1$, the diode D in the switching circuit $SW_1$ is turned on, thereby charging the sensing line $S_{Y1}$ to high voltage level of the scan signal. Without further control, the sensing line $S_{Y1}$ remaining at high voltage level is unable to provide subsequent scan signals under this circumstance. Thus, in the LCD device 200 of the present invention, the TFT switches in the switching circuits are used for controlling multi-touch applications. During the blanking periods of the scan signals, the reset circuit 260 of the gate driver 230 output reset signals to turn on the TFT switches in the switching circuits $SW_1$-$SW_n$. By turning on the TFT switches in the switching circuits $SW_1$-$SW_n$, the sensing lines $S_{Y1}$-$S_{Yn}$ can be discharged to low voltage level again. Therefore, the LCD device 200 of the present invention can provide multi-touch function.

Figure 3:
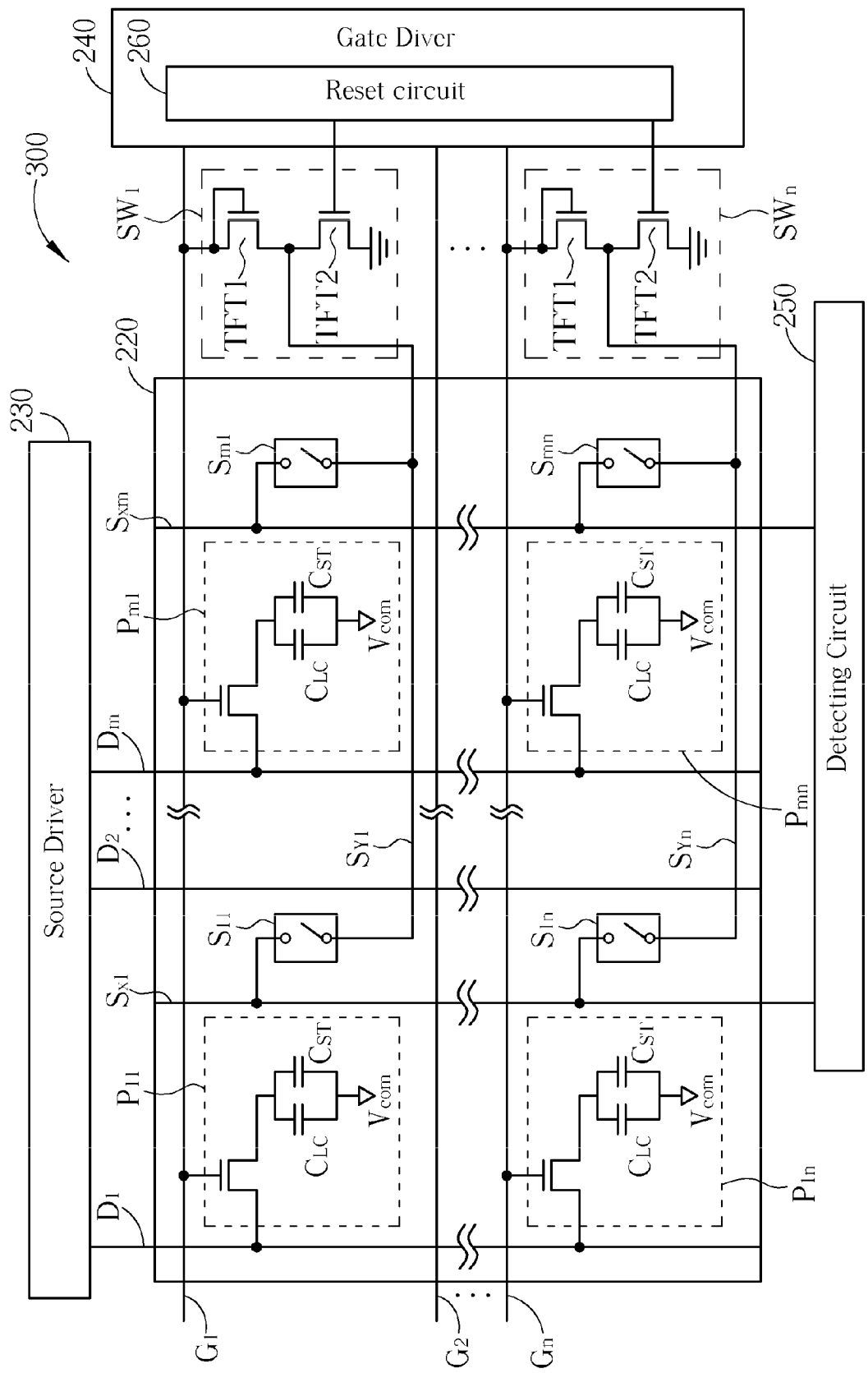
FIG. 3 is a diagram illustrating an LCD device with multi-touch function according to a second embodiment of the present invention.

Referring to FIG. 3, which is a diagram illustrating an LCD device 300 with multi-touch function according to a second embodiment of the present invention. The LCD device 300 and the LCD device 200 have similar structures, but differ in the switching circuits $SW_1$-$SW_n$. In the LCD device 200 according to the first embodiment of the present invention, each switching circuit includes a diode D and a TFT switch. In the LCD device 300 according to the second embodiment of the present invention, each switching circuit includes two TFT switches TFT1 and TFT2. The TFT switches TFT1 and TFT2 in the LCD device 300 provide the same function as the diode D and the TFT switch in the LCD device 200. Therefore, the operations of the LCD device 300 are similar to those of the LCD device 200 described in previous paragraphs.

Based on operation principles, the LCD devices 200 and 300 can use various types of sensing units, such as resistive/capacitive/piezoelectric voltage sensors or photo sensors using photo diodes/transistors. Also, the switching circuits $SW_1$-$SW_n$ can include diodes, TFT switches, or other switching devices providing similar function. The gate driver 240 and the switching circuits $SW_1$-$SW_n$ can be fabricated on the same printed circuit board (PCB).

Those skilled in the art will readily observe that numerous modifications and alterations of the device and method may be made while retaining the teachings of the invention.

What is claimed is:

1. A display panel with multi-touch function comprising:
   a display area comprising:
      a data line for transmitting a data signal corresponding to a display image;
      a gate line for transmitting a scan signal;
      a display unit coupled to the data line and the gate line for displaying images according to the scan signal and the data signal;
      a first sensing line for outputting a sensing signal corresponding to the scan signal;
      a second sensing line for transmitting the sensing signal; and
      a sensing unit coupled between the first and second sensing lines for electrically connecting the first sensing line with the second sensing line according to a touch signal or electrically isolating the first sensing line from the second sensing line; and
   a non-display area comprising:
      a gate driver for outputting the scan signal and a reset signal;
      a first switch coupled between the gate line and the second sensing line for providing a path to charge the second sensing line according to the scan signal; and
      a second switch coupled to the second sensing line for providing a path to discharge the second sensing line.

2. The display panel of claim 1 wherein the display unit comprises:
   a thin film transistor (TFT) switch having a control end coupled to the gate line and a first end coupled to the data line;
   a liquid crystal capacitor coupled between a second end of the TFT switch and a common voltage; and
   a storage capacitor coupled between the second end of the TFT switch and the common voltage.

3. The display panel of claim 1 wherein the first switch includes a diode or a TFT switch.

4. The display panel of claim 1 wherein the second switch includes a TFT switch.

5. The display panel of claim 1 wherein the second switch includes:
   a first end coupled to the second sensing line;
   a second end coupled to a ground level;
   a control end coupled to the gate driver for electrically connecting the first end with the second end according to the reset signal or electrically isolating the first end from the second end.

6. The display panel of claim 1 wherein the non-display area further comprises a source driver for providing the data signal.

7. The display panel of claim 1 wherein the non-display area further comprises a detecting circuit coupled to the first sensing line for determining where the touch signal occurs according to the sensing signal.

8. The display panel of claim 1 wherein the gate driver further comprises a reset circuit for generating the reset signal.

9. The display panel of claim 1 wherein the gate driver, the first switch and the second switch are disposed on a same printed circuit board (PCB).

10. The display panel of claim 1 wherein the sensing unit includes a voltage sensor or a photo sensor.

11. The display panel of claim 10 wherein the voltage sensor includes a capacitive voltage sensor or a piezoelectric device.

12. The display panel of claim 10 wherein the photo sensor includes a photo diode or a photo transistor.

13. A display panel with multi-touch function comprising:
   a display area comprising:
      a plurality of data lines for transmitting data signals corresponding to display images;
      a plurality of gate lines for transmitting scan signals;
      a plurality of display units each coupled to a corresponding data line among the plurality of data lines and to a corresponding gate line among the plurality of gate lines, each display unit displaying images according to the scan signal received from the corresponding gate line and the data signal received from the corresponding data line;
      a plurality of first sensing lines;
      a plurality of second sensing lines;
      a plurality of sensing units each coupled between a corresponding first line and a corresponding second sensing line, each sensing unit electrically connecting the corresponding first sensing line with the corresponding second sensing line according to a corresponding touch signal or electrically isolating the first corresponding sensing line from the second corresponding sensing line; and
   a non-display area comprising:
      a gate driver for outputting scan signals and reset signals; and
      a plurality of switch circuits for providing paths to charge the corresponding second sensing lines according to the corresponding scan signals and providing paths to discharge the corresponding second sensing lines according to the reset signals, respectively.

14. The display panel of claim 13 wherein each switch circuit comprises:
   a first switch coupled between a corresponding gate line and a corresponding second sensing line for providing the path to charge the corresponding second sensing line according to the corresponding scan signal; and
   a second switch coupled to the corresponding second sensing line for providing the path to discharge the corresponding second sensing line according to the reset signal.

15. The display panel of claim 14 wherein the second switch comprises:
   a first end coupled to the corresponding second sensing line;
   a second end coupled to a ground level; and
   a control end coupled to the gate driver for electrically connecting the first end with the second end according to the reset signal or electrically isolating the first end from the second end.

16. The display panel of claim 14 wherein the first switch includes a diode or a TFT switch.

17. The display panel of claim 14 wherein the second switch includes a TFT switch.

18. The display panel of claim 13 wherein the non-display area further comprises a source driver for providing the data signal.

19. The display panel of claim 13 wherein the non-display area further comprises a detecting circuit coupled to the plurality of first sensing lines for determining where the touch signal occurs.

20. The display panel of claim 13 wherein the gate driver further comprises a reset circuit for generating the reset signal.

21. The display panel of claim 13 wherein the gate driver and the plurality of switch circuits are disposed on a same PCB.

22. The display panel of claim 13 wherein the plurality of sensing units include voltage sensors or photo sensors.

23. The display panel of claim 22 wherein the voltage sensors include capacitive voltage sensors or piezoelectric devices.

24. The display panel of claim 22 wherein the photo sensors includes photo diodes or photo transistors.

* * * * *